(12) United States Patent
Kasami et al.

(10) Patent No.: US 7,305,213 B2
(45) Date of Patent: Dec. 4, 2007

(54) RECEIVER AND WIRELESS LAN APPARATUS IN WHICH A RECEIVED SIGNAL IS CORRELATED TO A REFERENCE SYMBOL

(75) Inventors: Hideo Kasami, Kanagawa-Ken (JP); Hidehiro Matsuoka, Kanagawa-Ken (JP); Tsuguhide Aoki, Kanagawa-Ken (JP); Kazumi Sato, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 594 days.

(21) Appl. No.: 10/810,811

(22) Filed: Mar. 29, 2004

(65) Prior Publication Data

US 2004/0192238 A1 Sep. 30, 2004

(30) Foreign Application Priority Data

Mar. 27, 2003 (JP) ............................. 2003-088288

(51) Int. Cl.
*H04B 1/00* (2006.01)
(52) U.S. Cl. ..................... 455/63.1; 455/504; 455/506; 455/278.1; 375/150; 375/148
(58) Field of Classification Search ............... 455/130, 455/424, 425, 456.5, 456.6, 550.1, 65, 575.1, 455/561, 67.11, 506, 501, 303, 504, 60, 63.1, 455/67.13, 67.16, 114.2, 133, 143, 214, 205, 455/213, 278.1, 273, 275, 277.1, 334, 312; 370/335, 318, 342, 333, 332, 208, 468; 375/343, 375/144, 148, 150, 260, 142, 147, 340, 346, 375/348, 324
See application file for complete search history.

(56) References Cited

U.S. PATENT DOCUMENTS

| | | | |
|---|---|---|---|
| 5,764,690 A | * | 6/1998 | Blanchard et al. .......... 375/147 |
| 6,014,373 A | * | 1/2000 | Schilling et al. ............ 370/342 |
| 6,188,679 B1 | * | 2/2001 | Sato .......................... 370/335 |
| 6,351,498 B1 | * | 2/2002 | Yamao et al. ............... 375/260 |
| 6,393,599 B1 | * | 5/2002 | Chan .......................... 714/797 |
| 6,411,610 B1 | * | 6/2002 | Li et al. ...................... 370/335 |
| 6,452,958 B1 | | 9/2002 | Van Nee |

(Continued)

FOREIGN PATENT DOCUMENTS

| | | | |
|---|---|---|---|
| JP | 2000-312167 | * | 11/2000 |
| JP | 2002-217789 | | 8/2002 |

OTHER PUBLICATIONS

Carl Andren, et al. "CCK Modulation Delivers 11Mbps for High Rate IEEE 802.11 Extension", Wireless Symposium/Portable By Design Conference Spring 1999, MS: 62A-024, 1999, pp. 1-10.

*Primary Examiner*—Edward F. Urban
*Assistant Examiner*—Charles Chow
(74) *Attorney, Agent, or Firm*—Oblon, Spivak, McClelland, Maier & Neustadt, P.C.

(57) ABSTRACT

A receiver comprising: an antenna which receives a radio signal including N possible symbols $\{c_1^{(n)}, c_2^{(n)}, \ldots c_{M-1}^{(n)}, c_M^{(n)}\}$, an N correlation units which are provided corresponding to the N possible symbols, respectively, each correlation unit detecting the degree of correlation with the radio signal received by the antenna, and a symbol determination unit which determines the symbol included in the radio signal received by the antenna based on the degree of correlation detected by the N correlation units. The N correlation units detect the degree of correlation between the radio signal received by the antenna and the N possible symbols represented by M chips $\{\alpha_0 c_1^{(n)}, \alpha_0 c_2^{(n)} + \alpha_1 c_1^{(n)}, \ldots, \alpha_0 c_{M-1}^{(n)} + \alpha_1 c_{M-2}^{(n)}, \alpha_0 c_M^{(n)} + \alpha_1 c_{M-1}^{(n)}\}$.

18 Claims, 7 Drawing Sheets

| $c_1^{(1)}$ | $c_2^{(1)}$ | $c_3^{(1)}$ | ... | $c_7^{(1)}$ | $c_8^{(1)}$ | |
|---|---|---|---|---|---|---|
| w1 / w2 / w3 | $c_1^{(1)}$ | $c_2^{(1)}$ | ... | $c_6^{(1)}$ | $c_7^{(1)}$ | $c_8^{(1)}$ |
| $c_1^{(1)}$ | $c_2^{(1)}+c_1^{(1)}$ | $c_3^{(1)}+c_2^{(1)}$ | ... | $c_7^{(1)}+c_6^{(1)}$ | $c_8^{(1)}+c_7^{(1)}$ | $c_8^{(1)}$ |

U.S. PATENT DOCUMENTS

| | | |
|---|---|---|
| 6,603,746 B1 * | 8/2003 | Larijani et al. ............. 370/318 |
| 6,606,347 B1 * | 8/2003 | Ishii ........................... 375/144 |
| 6,678,313 B1 * | 1/2004 | Imaizumi et al. ........... 375/150 |
| 6,839,378 B1 * | 1/2005 | Sourour et al. ............. 375/142 |
| 6,937,648 B2 * | 8/2005 | Raphaeli ..................... 375/229 |
| 7,010,559 B2 * | 3/2006 | Rawlins et al. ............. 708/425 |
| 7,065,158 B2 * | 6/2006 | Awater et al. ............... 375/322 |
| 7,123,647 B1 * | 10/2006 | Sheng ......................... 375/150 |
| 7,145,969 B1 * | 12/2006 | Hu et al. ..................... 375/343 |
| 2002/0155812 A1 * | 10/2002 | Takada ......................... 455/63 |
| 2004/0091023 A1 * | 5/2004 | Chen et al. .................. 375/148 |
| 2004/0096017 A1 * | 5/2004 | Holt et al. ................... 375/343 |
| 2006/0164270 A1 * | 7/2006 | Miller et al. ................ 341/143 |
| 2006/0166634 A1 * | 7/2006 | Ido ........................... 455/277.1 |

* cited by examiner

F I G. 1

| EVEN SYMBOL PHASE SHIFT | digit pattern(d0,d1) | ODD SYMBOL PHASE SHIFT |
|---|---|---|
| 0 | 00 | π |
| π/2 | 01 | 3π/2 |
| π | 11 | 0 |
| 3π/2 | 10 | π/2 |

F I G. 2

| digit pattern(di,d(i+1)) | PHASE OF $\phi_i$ |
|---|---|
| 00 | 0 |
| 01 | π/2 |
| 10 | π |
| 11 | 3π/2 |

| $c_1^{(1)}$ | $c_2^{(1)}$ | $c_3^{(1)}$ | ... | $c_7^{(1)}$ | $c_8^{(1)}$ | |
|---|---|---|---|---|---|---|
| | $c_1^{(1)}$ | $c_2^{(1)}$ | ... | $c_6^{(1)}$ | $c_7^{(1)}$ | $c_8^{(1)}$ |
| $c_1^{(1)}$ | $c_2^{(1)}+c_1^{(1)}$ | $c_3^{(1)}+c_2^{(1)}$ | ... | $c_7^{(1)}+c_6^{(1)}$ | $c_8^{(1)}+c_7^{(1)}$ | $c_8^{(1)}$ | w1, w2, w3

F I G. 5

F I G. 6

F I G. 7

F I G. 8

F I G. 9

RECEIVER AND WIRELESS LAN APPARATUS IN WHICH A RECEIVED SIGNAL IS CORRELATED TO A REFERENCE SYMBOL

CROSS REFERENCE TO RELATED APPLICATIONS

This application claims benefit of priority under 35 USC §119 to Japanese Patent Application No. 2003-88288, filed on Mar. 27, 2003, the entire contents of which are incorporated by reference herein.

BACKGROUND OF THE INVENTION

1. Field of the Invention

The present invention relates to a receiver that receives a radio signal including N possible symbols (where N is an integer having a value of at least two) each represented by M chips (where M is an integer having a value of at least two), and detects the degree of correlation with a symbol serving as a reference, and its receiving method.

2. Related Background Art

In the CCK (Complementary Code Keying) modulation scheme adopted in IEEE802.11b, signal modulation is conducted by using 64 possible symbols each represented by 8 chips.

An example in which a plurality of correlation processing units for detecting the degree of correlation of the symbols included in the radio signal and a symbol determination unit for determining the symbols are provided is disclosed in Japanese Patent Laid-open 217789/2002.

The symbol determination unit selects the maximum output among the outputs of a plurality of correlation processing units, and detects a phase of the output of the selected correlation processing unit. Thereby, $\{\phi1, \phi2, \phi3, \phi4\}$ dependent on data bits is decided, and the symbols are determined.

In a multipath environment in which a delay wave exists, however, cross-correlation characteristics between symbols deteriorates by the influence of the delay wave, and the output of the correlation processing unit corresponding to a transmission symbol does not become the maximum.

For example, it is supposed that both a preceding wave w1 of a certain symbol and a one-chip delay wave of the preceding wave w1 are received by the receiver. In this case, originally, only the output of the correlation processing unit having a symbol corresponding to the preceding wave w1 should become the maximum. In a multipath environment having the preceding wave w1 and a one-chip delay wave w2 as a mixture, however, both the output of the correlation processing unit having the symbol corresponding to the preceding wave w1 and an output of a correlation processing unit having a symbol corresponding to the one-chip delay wave become large. Therefore, there is a likelihood that the transmission symbol cannot be discriminated uniquely by using only outputs of the correlation processing units.

BRIEF SUMMARY OF THE INVENTION

In order to solve the above-described problem, an object of the present invention is to provide a receiver and a receiving method capable of determining a transmission symbol accurately and simply.

A receiver according to one embodiment of the present invention comprising:

an antenna which receives a radio signal including N possible symbols $\{c_1^{(n)}, c_2^{(n)}, \ldots c_{M-1}^{(n)}, c_M^{(n)}\}$ (where n is an integer satisfying the relation $1<n\leq N$) each symbol represented by M chips (M is an integer equal to or more than 2);

an N correlation units which are provided corresponding to said N possible symbols, respectively, each correlation unit detecting the degree of correlation with the radio signal received by said antenna; and a symbol determination unit which determines the symbol included in the radio signal received by said antenna based on the degree of correlation detected by said N correlation units, wherein said N correlation units detect the degree of correlation between the radio signal received by said antenna and the N possible symbols represented by M chips $\{\alpha_0 c_1^{(n)}, \alpha_0 c_2^{(n)}+\alpha_1 c_1^{(n)}, \ldots, \alpha_0 c_{M-1}^{(n)}+\alpha_1 c_{M-2}^{(n)}, \alpha_0 c_M^{(n)}+\alpha_1 c_{M-1}^{(n)}\}$ (where n is an integer satisfying the relation $1<n\leq N$, and $\alpha0$ and $\alpha1$ are non-zero constants).

Furthermore, a receiver according to one embodiment of the present invention comprising:

an antenna which receives a radio signal including N possible symbols $\{c_1^{(n)}, c_2^{(n)}, \ldots c_{M-1}^{(n)}, c_M^{(n)}\}$ (where n is an integer satisfying the relation $1<n\leq N$) each symbol represented by M chips (M is an integer equal to or more than 2);

an N correlation units which are provided corresponding to said N possible symbols, respectively, each correlation unit detecting the degree of correlation with the radio signal received by said antenna; and a symbol determination unit which determines the symbol included in the radio signal received by said antenna, based on the degree of correlation detected by said N correlation units, wherein said N correlation units detect the degree of correlation between the radio signal received by said antenna and N possible symbols $\alpha_0 c_1^{(n)}$,
$\alpha_0 c_2^{(n)}+\alpha_1 c_1^{(n)}$,
$\alpha_0 c_3^{(n)}+\alpha_1 c_2^{(n)}+\alpha_2 c_1^{(n)}$,
⋮
$\alpha_0 c_{M-1}^{(n)}+\alpha_1 c_{M-2}^{(n)}+\alpha_2 c_{M-3}^{(n)}+,\ldots,+\alpha_{m-2} c_1^{(n)}$,
$\alpha_0 c_M^{(n)}+\alpha_1 c_{M-1}^{(n)}+\alpha_2 c_{M-2}^{(n)}+,\ldots,+\alpha_{M-2} c_2^{(n)}+\alpha_{M-1} c_1^{(n)}$ each symbol represented by M chips (where n is an integer satisfying the relation $1<n\leq N$, and $\alpha0$ and $\alpha1$ are non-zero constants, $\alpha_2, \ldots, \alpha_{M-1}$ are constants).

DETAILED DESCRIPTION OF THE INVENTION

Hereafter, a receiver and a receiving method according to the present invention will be described more specifically with reference to the drawings.

First Embodiment

Figure 1:
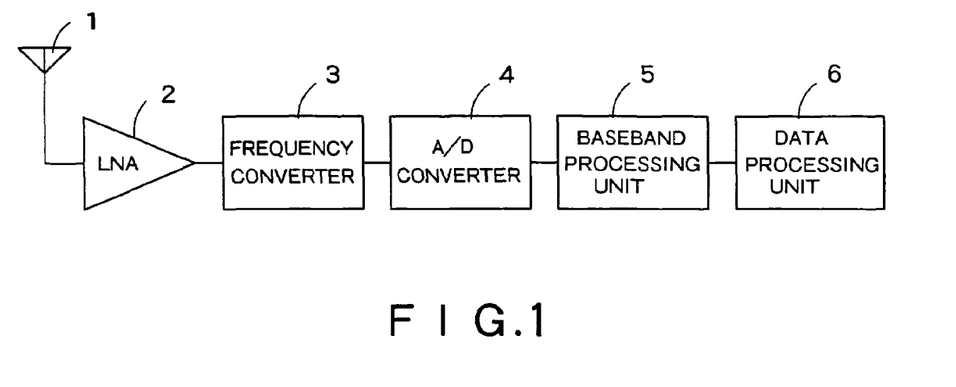
FIG. 1 is a block diagram showing an overall configuration of a receiver according to a first embodiment of the present invention.

FIG. 1 is a block diagram showing an overall configuration of a receiver according to a first embodiment of the present invention. For example, a configuration for receiving a radio signal of the CCK modulation scheme is shown. The receiver of FIG. 1 includes an antenna 1 for receiving a radio signal including 64 possible symbols each represented by eight chips $\{c_1^{(n)}, c_2^{(n)}, \ldots c_7^{(n)}, c_8^{(n)}\}$ (where n is an integer satisfying the relation $1 < n \leq 64$), an INA (Low Noise Amplifier) unit 2 for amplifying the radio signal received by the antenna, a frequency converter 3 for converting an output signal of the INA 2 to a low frequency signal, an A/D converter 4 for converting an output signal of the frequency converter 3 to a digital signal, a baseband processing unit 5 for conducting demodulation on the basis of the digital signal, and a data processing unit 6 for conducting various kinds of processing on the basis of an output of the baseband processing unit 5.

The baseband processing unit 5 determines a certain symbol included in the radio signal. The data processing unit 6 performs so-called decoding processing. In the decoding processing, the determined certain symbol is converted into data sequence consisted of 0 and 1, and the kinds of data is determined by putting delimiters in the data sequence.

In the CCK (Complementary Code Keying) modulation scheme, signal modulation is conducted by using 64 possible symbols each represented by 8 chips as shown in expression (1).

$$c_1 = \exp\{j(\phi 1 + \phi 2 + \phi 3 + \phi 4)\}$$

$$c_2 = \exp\{j(\phi 1 + \phi 3 + \phi 4)\}$$

$$c_3 = \exp\{j(\phi 1 + \phi 2 + \phi 4)\}$$

$$c_4 = \exp\{j(\phi 1 + \phi 4)\}$$

$$c_5 = \exp\{j(\phi 1 + \phi 2 + \phi 3)\}$$

$$c_6 = \exp\{j(\phi 1 + \phi 3)\}$$

$$c_7 = \exp\{j(\phi 1 + \phi 2)\}$$

$$c_8 = \exp\{j(\phi 1)\} \quad (1)$$

Figure 2:
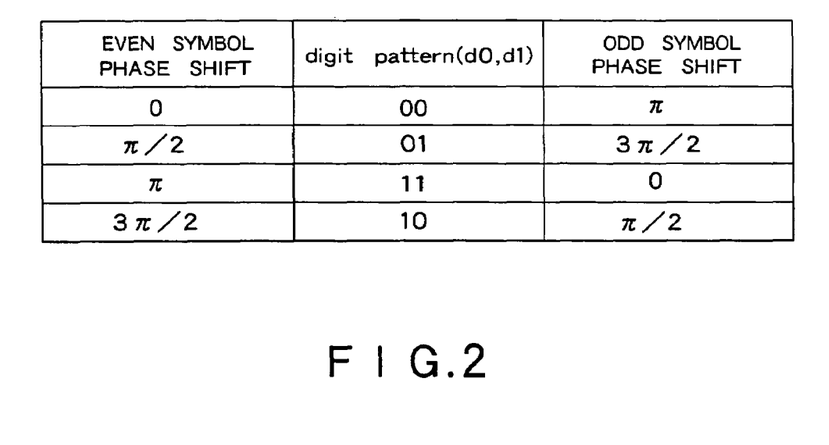
FIG. 2 is a diagram showing a definition of $\phi1$.
Figure 3:
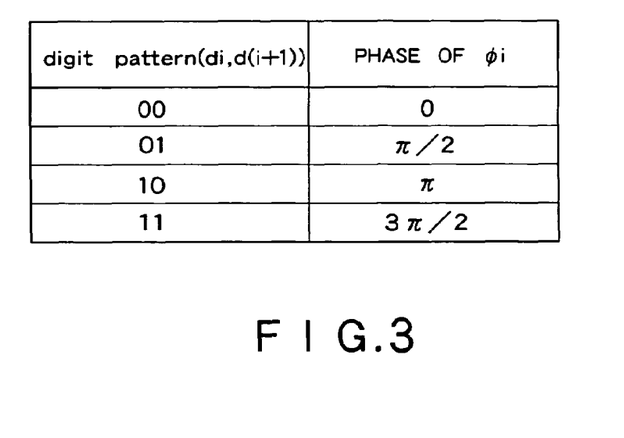
FIG. 3 is a diagram showing definitions of $\phi2$, $\phi3$ and $\phi4$.

Here, $\{\phi 1, \phi 2, \phi 3, \phi 4\}$ is a value depending upon data bits. If the transmission rate is 11 Mbps, $\{\phi 1, \phi 2, \phi 3, \phi 4\}$ is defined with respect to 8-bit data bits $\{d0, d1, d2, d3, d4, d5, d6, d7\}$ as shown in FIGS. 2 and 3.

A symbol is the unit of information. A chip is the unit of mark (character) included in a symbol.

Reception processing of the CCK will now be described. In the CCK, there is a possibility that any of 256 possible symbols each represented by 8 chips is received. Since $\phi 1$ means rotation of a symbol, however, the total number of correlation processing units 31 provided in a receiver may be 64 as shown in FIG. 10.

Figure 4:
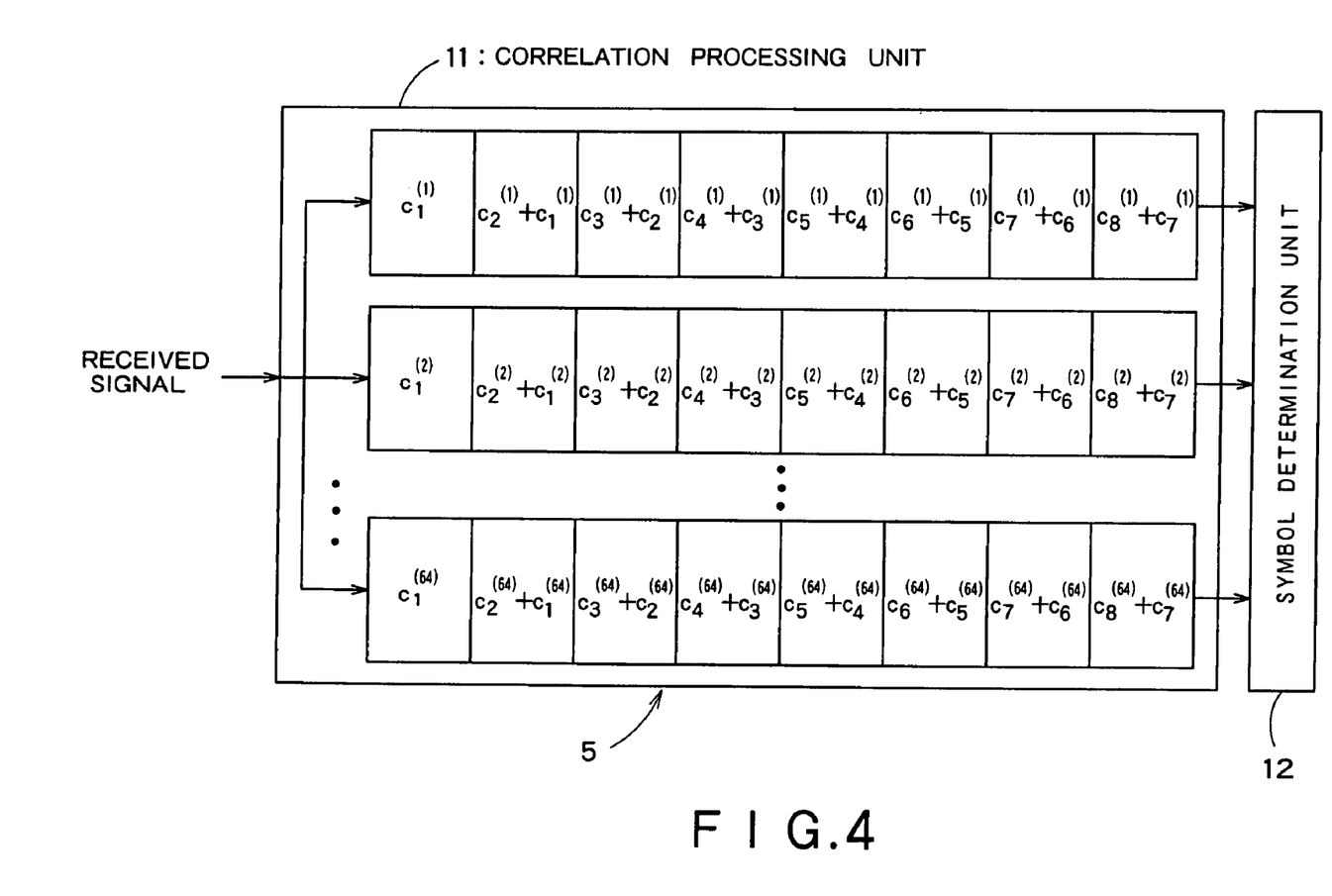
FIG. 4 is a block diagram showing the internal configuration of the baseband processing unit.

In the configuration shown in FIG. 1, a featured portion of the present invention is the baseband processing unit 5. The baseband processing unit 5 has, for example, a configuration as shown in FIG. 4. The baseband processing unit 5 shown in FIG. 4 includes 64 correlation processing units 11 for detecting the degree of correlation with the radio signal received by the antenna 1, and a symbol determination unit 12 for determinating a transmission symbol on the basis of an output of these correlation processing units 11.

The symbol determination unit 12 determinates a symbol corresponding to a correlation processing unit 11 generating a maximum output level among outputs of 64 correlation processing units 11, as the transmission symbol.

Each of the 64 correlation processing units 11 detects the degree of correlation between the radio signal received by the antenna 1 and $\{c_1^{(n)}, c_2^{(n)}+c_1^{(n)}, \ldots c_7^{(n)}+c_6^{(n)}, c_8^{(n)}+c_7^{(n)}\}$ (where n is an integer satisfying the relation $1 < n \leq 64$).

By forming the correlation processing unit 11 as shown in FIG. 4, it becomes possible to detect the degree of correlation not only with the preceding wave contained in the radio signal received by the antenna 1 but also with the one-chip delay wave contained therein. For example, it is supposed that the a preceding wave w1 including a symbol as shown in FIG. 5 and a one-chip delay wave w2 for the preceding wave w1 have been received by the receiver.

Figure 5:
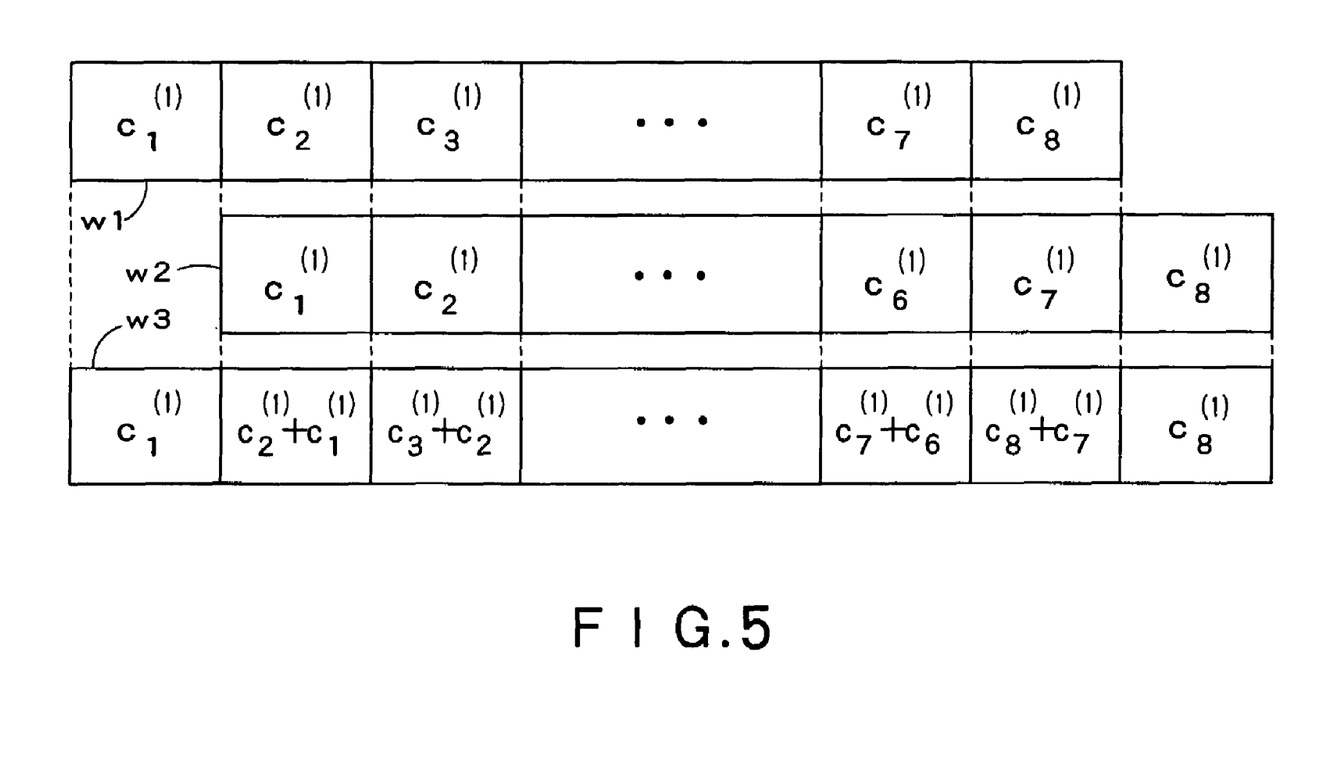
FIG. 5 is a diagram showing the symbols of the preceding wave and one-chip delay wave.

In order to conduct symbol determination on the basis of both the preceding wave w1 and the one-chip delay wave w2 in this case, the correlation processing unit 11 should have only a symbol equivalent to a sum of the symbol in the preceding wave w1 and the symbol in the one-chip delay wave w2 as represented by w3 in FIG. 5. In the present embodiment, therefore, the 64 correlation processing units 11 are previously provided with the symbol equivalent to the sum of the symbol in the preceding wave w1 and the symbol in the one-chip delay wave w2.

The reason why the degree of correlation is detected by taking only the one-chip delay wave among delay waves into consideration is that it is seldom that a delay of two chips or more occurs.

In the w3 shown in FIG. 5, $c_8^{(1)}$ is not included in the correlation processing units. This is conducted to avoid interference from the next symbol.

Thus, in the present embodiment, symbol determination is conducted by taking into consideration also the degree of correlation of the one-chip delay wave, which has a high possibility of affecting the current symbol received by the receiver. As compared with the case where symbol determination is conducted by using only the preceding wave, cross-correlation characteristics can be improved. Since symbol decision is conducted without taking into consideration the degree of correlation of the component $c_8^{(1)}$ in the delay wave, which has a high possibility of being affected by the next symbol, among delay waves, interference from the next symbol is not caused.

Second Embodiment

In a second embodiment, the degree of correlation is detected in the correlation processing unit 11 by taking into consideration a channel impulse response coefficient of the preceding wave contained in the radio signal received by the antenna 1 and a channel impulse response coefficient of the one-chip delay wave contained therein.

In the second embodiment of a receiver according to the present invention, the internal configuration of the baseband processing unit 5 is different from that in the first embodiment and other configurations are the same as those in the first embodiment.

Figure 6:
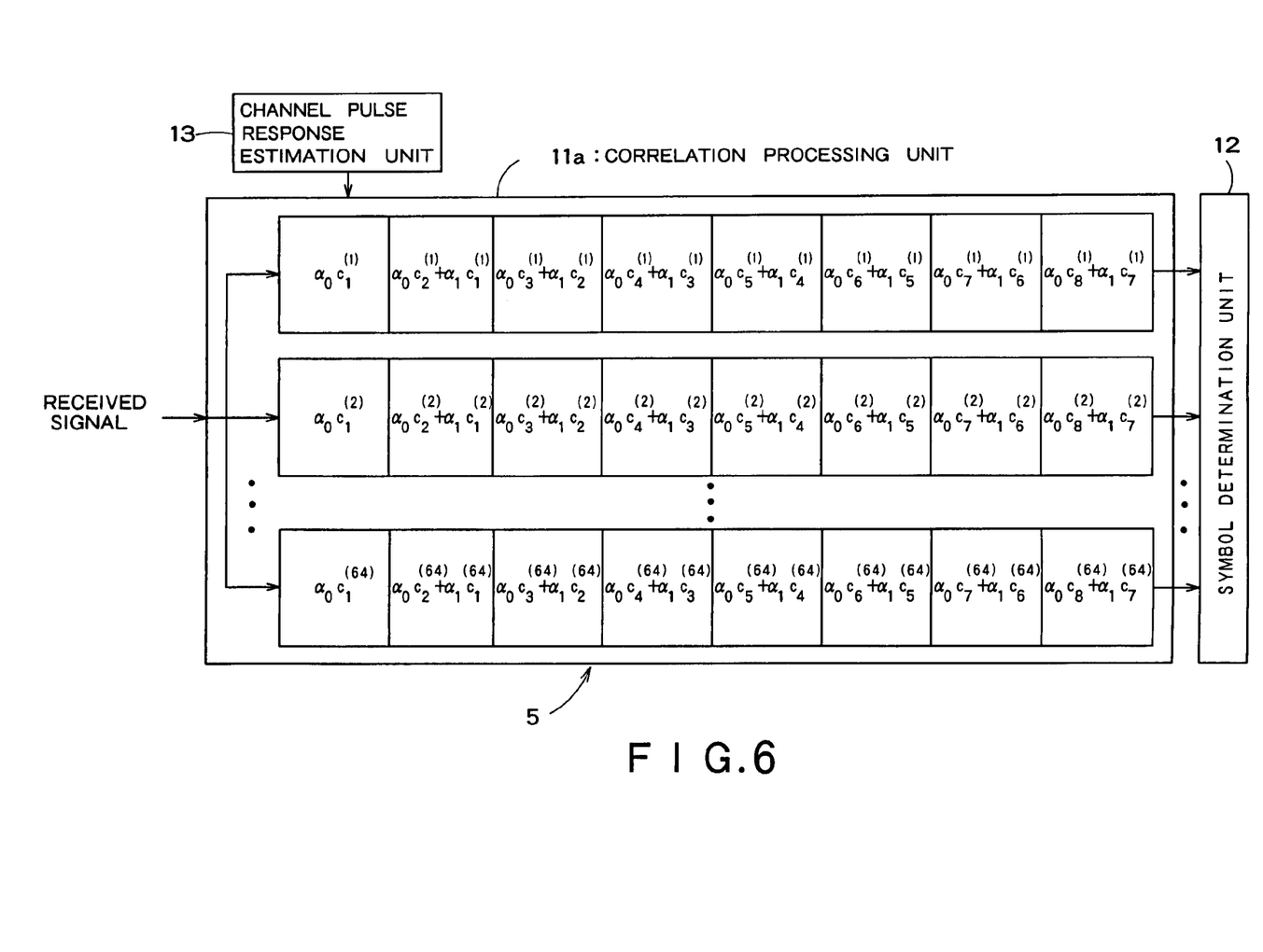
FIG. 6 is a block diagram showing the internal configuration of the baseband processing unit according to the second embodiment.

FIG. 6 is a block diagram showing an internal configuration according to the second embodiment of the baseband processing unit 5. The baseband processing unit 5 of FIG. 6 includes a correlation processing unit 11a having a configuration different from that in the first embodiment and a symbol determination unit 12 similar to that in the first embodiment. Besides, the baseband processing unit 5 of FIG. 6 includes a channel impulse response estimation unit 13.

The correlation processing unit 11a detects the degree of correlation between a radio signal received by the antenna 1 and $\{\alpha_0 c_1^{(n)}, \alpha_0 c_2^{(n)} + \alpha_1 c_1^{(n)}, \ldots \alpha_0 c_7^{(n)} + \alpha_1 c_6^{(n)}, \alpha_0 c_8^{(n)} + \alpha_5 c_7^{(n)}\}$ (where n is an integer satisfying the relation $1 < n \leq 64$ and $\alpha_0$ and $\alpha_1$ are non-zero constants).

The ratio between $\alpha_0$ and $\alpha_1$ is equal to the ratio between the transmission line coefficient of the preceding wave contained in the radio signal received by the antenna 1 and the channel impulse response coefficient of the one-chip delay wave contained therein. The channel impulse response coefficients are estimated by the channel impulse response estimation unit 13.

The reason why the degree of correlation is detected by taking the channel impulse response coefficient into consideration is that there is a likelihood that the reception strength and signal delay quantity of the radio signal received by the antenna 1 will change with time. By estimating the channel impulse response coefficients of the preceding wave and the one-chip delay wave and then detecting the degree of correlation, detection of the degree of correlation conforming to the variation of the reception environment can be conducted. Even in an environment in which the reception strength and signal delay quantity of the radio signal are apt to vary, therefore, the cross-correlation characteristics can be improved.

Third Embodiment

In a third embodiment, a two-chip delay wave is removed and then the degree of correlation is detected in the correlation processing unit 11a.

In the third embodiment of a receiver according to the present invention, the internal configuration of the baseband processing unit 5 is different from that in the second embodiment and other configurations are the same as those in the second embodiment.

Figure 7:
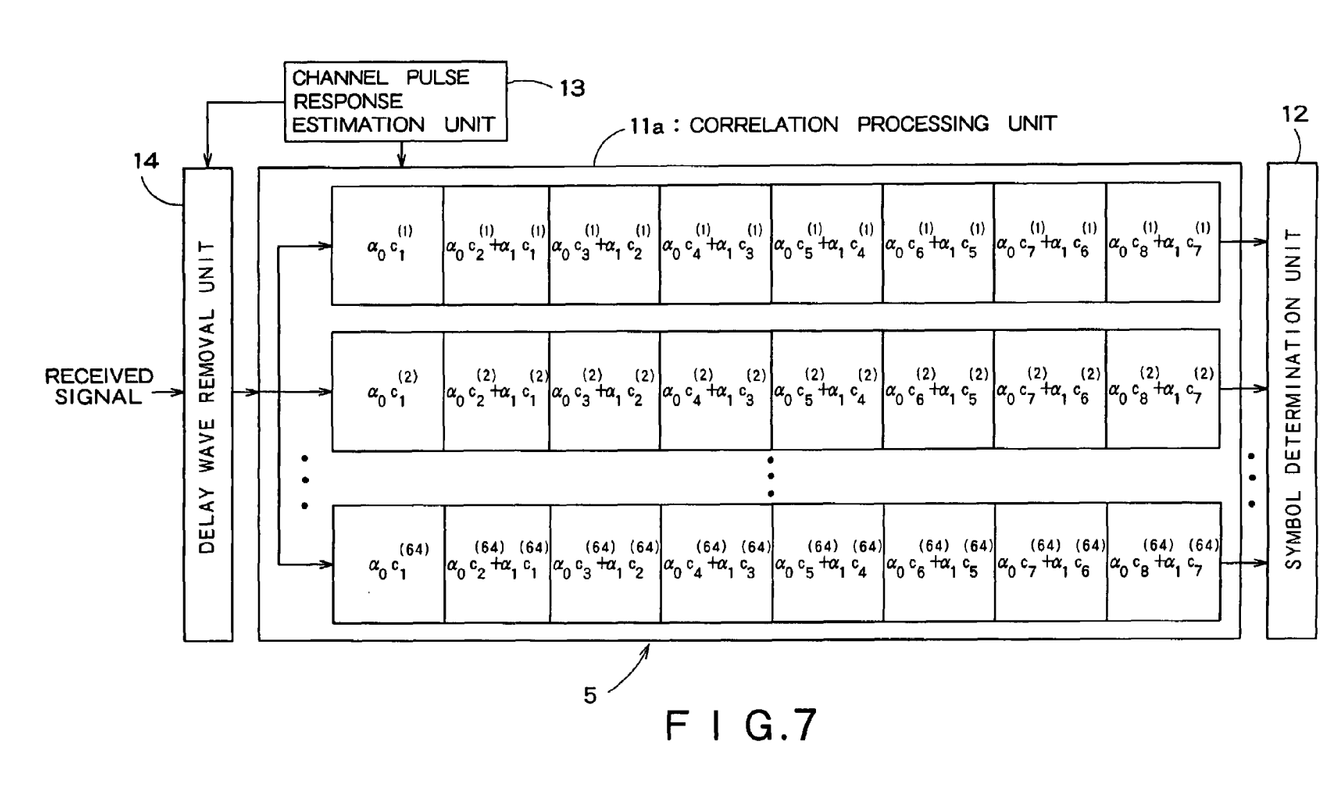
FIG. 7 is a block diagram showing the internal configuration of the baseband processing unit according to the third embodiment.

FIG. 7 is a block diagram showing an internal configuration according to the third embodiment of the baseband processing unit 5. The baseband processing unit 5 of FIG. 7 includes a correlation processing unit 11a, a symbol determination unit 12 and a channel impulse response response estimation unit 13, which are similar to those in the second embodiment. Besides, the baseband processing unit 5 of FIG. 7 includes a delay wave removal unit 14.

The delay wave removal unit 14 of FIG. 7 removes the two-chip delay wave contained in the radio signal received by the antenna 1. The delay wave removal unit 14 has an internal configuration represented by, for example, a block diagram shown in FIG. 8.

Figure 8:
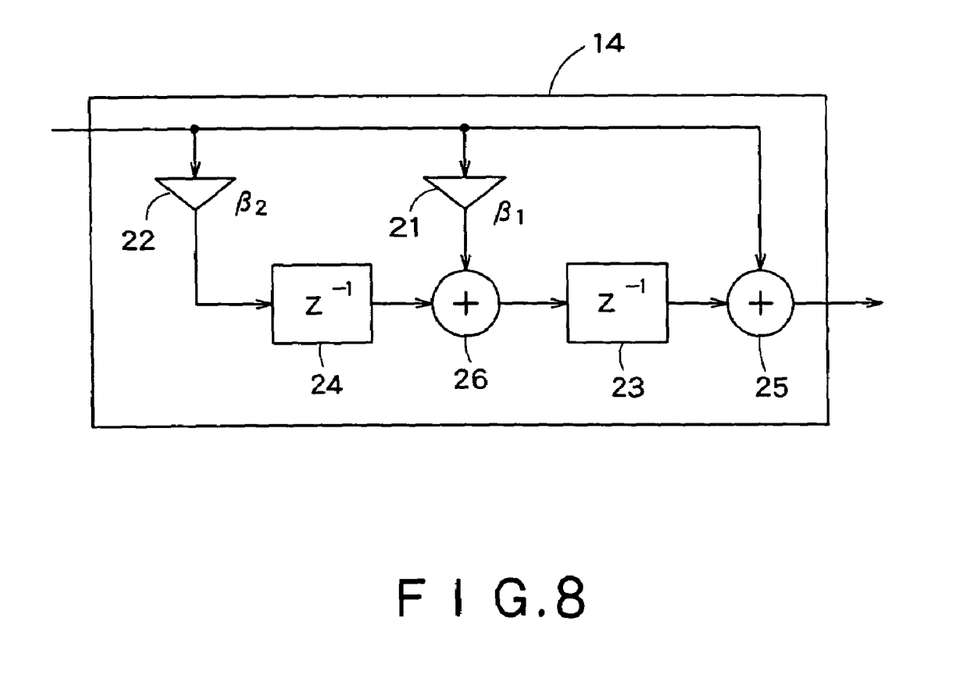
FIG. 8 is a block diagram showing the internal configuration of the delay wave removal unit.

The delay wave removal unit 14 of FIG. 8 includes amplifiers 21 and 22, delay units 23 and 24, and adders 25 and 26. The adder 26 adds a signal obtained by delaying an output of the amplifier 22 by one chip and an output of the amplifier 21. The adder 25 adds a signal obtained by delaying an output of the adder 26 by one chip and the radio signal contained in the received signal from the antenna 1.

By setting the channel impulse response coefficient of the preceding wave equal to $\alpha_0$, the channel impulse response coefficient of the one-chip delay wave equal to $\alpha_1$, the channel impulse response coefficient of the two-chip delay wave equal to $\alpha_2$, a gain $\beta_1$ of the amplifier 21 equal to zero, and a gain $\beta_2$ of the amplifier 22 equal to $-\alpha_2/\alpha_1$, the two-chip delay wave is removed on the basis of the preceding wave contained in the radio signal received by the antenna 1. By thus removing the two-chip delay wave on the basis of the preceding wave, it is possible to detect the degree of correlation with the two-chip delay wave under the minimum phase condition removed, and improve the removal performance of the two-chip delay wave.

On the other hand, if the gain $\beta_1$ of the amplifier 21 is set equal to $-\alpha_2/\alpha_1$ and the gain $\beta_2$ of the amplifier 22 is set equal to zero, the two-chip delay wave is removed on the basis of the one-chip delay wave. By thus removing the two-chip delay wave on the basis of the one-chip delay wave, it is possible to detect the degree of correlation by removing the two-chip delay wave under non-minimum phase condition, and improve the removal performance of the two-chip delay wave.

Thus, in the third embodiment, the removal performance of the two-chip delay wave under the minimum phase condition or non-minimum phase condition can be improved by changing the setting in the delay wave removal unit 14.

Fourth Embodiment

In a fourth embodiment, the setting in the delay wave removal unit 14 is changed according to signal levels of the preceding wave and the one-chip delay wave.

Figure 9:
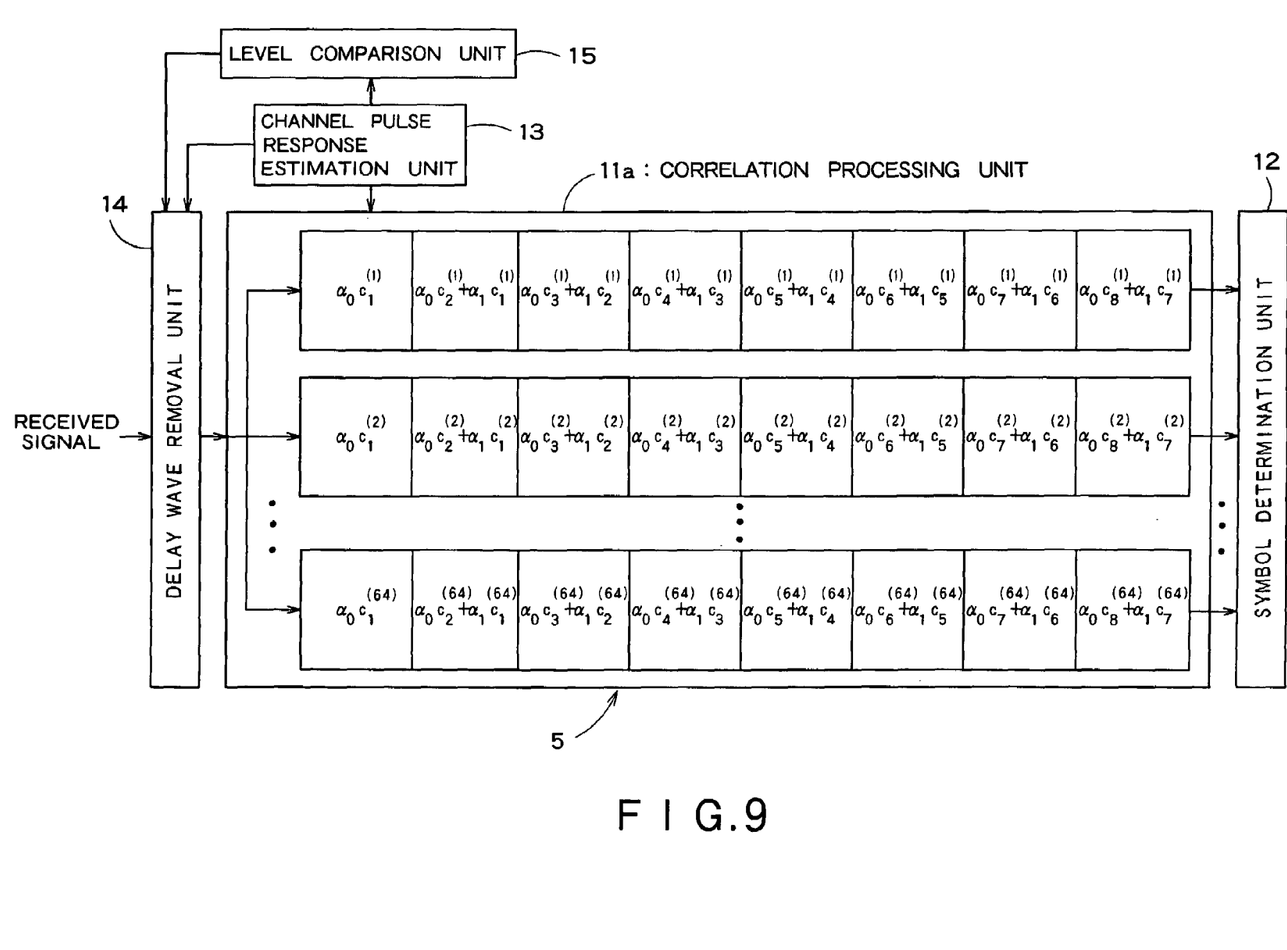
FIG. 9 is a block diagram showing the internal configuration of the baseband

FIG. 9 is a block diagram showing an internal configuration according to the fourth embodiment of the baseband processing unit 5. The baseband processing unit 5 of FIG. 9 includes a correlation processing unit 11a, a symbol determination unit 12, a channel impulse response response estimation unit 13 and a delay wave removal unit 14, which are similar to those in the third embodiment. Besides, the baseband processing unit 5 of FIG. 7 includes a level comparison unit 15.

The level comparison unit 15 compares signal levels of the preceding wave contained in the radio signal received by the antenna 1 and the one-chip delay wave contained therein with each other. The delay wave removal unit 14 sets the gains $\beta_1$ and $\beta_2$ of the amplifiers on the basis of a result of the comparison in the level comparison unit 15.

Specifically, in the case where the signal level of the preceding wave is higher than the signal level of the one-chip delay wave, i.e., $\alpha_0 > \alpha_1$, the two-chip delay wave is removed on the basis of the preceding wave by setting $\beta$hd 1=0 and $\beta_2 = -\alpha_2/\alpha_1$.

In the case where $\alpha_0 \leq \alpha_1$, the two-chip delay wave is removed on the basis of the one-chip delay wave by setting $\beta_1 = -\alpha_2/\alpha_1$ and $\beta_2 = 0$.

Thus, in the fourth embodiment, the setting in the delay wave removal unit is changed according to the signal levels of the preceding wave and the one-chip delay wave. Therefore, it becomes unnecessary to manually change the setting in the channel impulse response estimation unit 3 and the removal performance of the two-chip delay wave can be improved certainly.

In the above-described embodiments, the example in which a radio signal of the CCK modulation scheme is received has been described. However, the present invention can also be applied to M-ary modulation schemes other than the CCK modulation scheme.

Expressions of Walsh coding serving as one of M-ary modulation scheme are as follows.

Data 00→Symbol: 1 1 1 1
Data 01→Symbol: 1 −1 1 −1
Data 10→Symbol: 1 1 −1 −1
Data 11→Symbol: 1 −1 −1 1

In this case, one symbol is consisted of four chips, and a value of each chip is 1 or −1. The correlation processing unit 11 detects the degree of correlation between the reception signal and the above-mentioned four symbols.

In the above-described embodiments, the example in which each symbol is formed of eight chips has been described. However, there are no special restraints on the number of chips forming each symbol.

In the above-described embodiments, the example in which the degree of correlation is detected by taking into consideration only the one-chip delay wave besides the preceding wave has been described. However, the degree of correlation may also be detected by taking into consideration a k-chip delay wave (where k is an integer having a value of at least two).

In this case, the correlation processing unit 11 detects the degree of correlation between the radio signal received by the antenna 1 and N possible symbols (where N is an integer having a value of at least two) each represented by M chips (where M is an integer having a value of at least two)

$\alpha_0 c_1^{(n)}$
$\alpha_0 c_2^{(n)} + \alpha_1 c_1^{(n)}$
$\alpha_0 c_3^{(n)} + \alpha_1 c_2^{(n)} + \alpha_2 c_1^{(n)}$
:
:
$\alpha_0 c_{M-1}^{(n)} + \alpha_1 c_{M-2}^{(n)} + \alpha_2 c_{M-3}^{(n)}, \ldots, + \alpha_{M-2} c_1^{(n)}$
$\alpha_0 c_M^{(n)} + \alpha_1 c_{M-1}^{(n)} + \alpha_2 c_{M-2}^{(n)}, \ldots \alpha_{M-2} c_2^{(n)} + \alpha_{M-1} c_1^{(n)}$ (where n is an integer satisfying the relation $1 < n \leq N$, as and $\alpha_1$ are non-zero constants, and $\alpha_2, \ldots, \alpha_{M-1}$ are constants).

As a result, the degree of correlation can be detected by taking the two or more-chip delay wave into consideration.

The receiver according to the present invention is applicable to, for example, a wireless LAN apparatus. In this case, for example, the wireless LAN apparatus is provided with the receiver of FIG. 1 and a transmitter not shown. The receiver and the transmitter use a common antenna The modulation scheme adopted by the wireless LAN apparatus may be the CCK modulation scheme or the M-ary modulation scheme.

At least a portion of the receiver described above in the embodiments may be implemented by hardware, or may be implemented by software. In the case where at least a portion of the receiver is implemented by software, a program to implement the function of the receiver may be stored on a recording medium, such as a floppy disk or a CD-ROM, or may be read by a computer to be executed thereby. The recording medium is not limited to a portable medium such as a magnetic disk or an optical disk, but may also be a stationary recording medium such as a hard disk device or a memory.

Furthermore, a program for implementing the function of the service providing program may also be distributed via a communication line (including radio communication) such as the Internet or the like. In addition, the program may be distributed in such a state that the program is encrypted, modulated or compressed, via a wired line, such as the Internet, or a radio line, or in a form stored in a recording medium.

Note that the present invention is by no means limited to the above embodiments and may be embodied by modifying the components thereof within a range that does not depart from the gist of the invention. Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following. Further, the components of different embodiments may be appropriately combined.

What is claimed is:

1. A receiver, comprising:

an antenna which receives a radio signal including N possible symbols $\{c_1^{(n)}, c_2^{(n)}, \ldots c_{M-1}^{(n)}, c_M^{(n)}\}$, where n is an integer satisfying the relation $1 < n \leq N$, each symbol represented by M chips, M is an integer equal to or more than 2;

N correlation units corresponding to said N possible symbols, respectively, each correlation unit detecting the degree of correlation with the radio signal received by said antenna; and a symbol determination unit which determines the symbol included in the radio signal received by said antenna based on the degree of correlation detected by said N correlation units, wherein said N correlation units detect the degree of correlation between the radio signal received by said antenna and the N possible symbols represented by M chips $\{\alpha_0 c_1^{(n)}, \alpha_0 c_2^{(n)} + \alpha_1 c_1^{(n)}, \ldots, \alpha_0 c_{M-1}^{(n)} + \alpha_1 c_{M-2}^{(n)}, \alpha_0 c_M^{(n)} + \alpha_1 c_{M-1}^{(n)}\}$, where n is an integer satisfying the relation $1 < n \leq N$, and $\alpha 0$ and $\alpha 1$ are non-zero constants, and a ratio between said $\alpha 0$ and $\alpha 1$ is a ratio between a channel impulse response coefficient of a preceding wave and a channel impulse response coefficient of a one-chip delay wave each included in the radio signal received by said antenna.

2. The receiver according to claim 1, further comprising a delay removal unit configured to remove a k-chip delay wave (where k is a constant equal to or more than 2) from the radio signal, the delay removal unit having a plurality of outputs, wherein the outputs of said delay removal unit are inputted to said N correlation units, respectively.

3. The receiver according to claim 2, wherein said delay removal unit removes said k-chip delay wave from the radio signal based on the preceding wave included in the radio signal received by said antenna.

4. The receiver according to claim 2, wherein said delay removal unit removes said k-chip delay wave from the radio signal based on the one-chip delay wave included in the radio signal received by said antenna.

5. The receiver according to claim 1, further comprising a level comparison unit configured to compare a signal level of the preceding wave with a signal level of the one-chip delay wave each included in the radio signal received by said antenna, wherein said delay removal unit removes the k-chip delay wave by using the preceding wave or the one-chip delay wave with larger signal level based on a comparison result of said level comparison unit.

6. The receiver according to claim 1, further comprising:
an amplifier which amplifies the wireless signal received by said antenna;
a frequency converter which converts the output signal of said amplifier to a low-frequency signal; and
an A/D converter which converts the output signal of said frequency converter to a digital signal,
wherein said N correlation units detect the degree of correlation based on the digital signal.

7. The receiver according to claim 1, wherein N correlation units detect the degree of correlation with respect to a wireless signal of CCK (Complementary Code Keying) modulation scheme or M-ary modulation scheme received by said antenna.

8. A receiver comprising:
an antenna configured to receive a radio signal including N possible symbols $\{c_1^{(n)}, c_2^{(n)}, \ldots c_{M-1}^{(n)}, c_M^{(n)}\}$, where n is an integer satisfying the relation $1 < n \leq N$, each symbol represented by M chips, M is an integer equal to or more than 2;
N correlation units corresponding to said N possible symbols, respectively, each correlation unit configured to detect the degree of correlation with a preceding wave and a k-chip delay wave included in the radio signal received by said antenna; and
a symbol determination unit configured to determine the symbol included in the radio signal received by said antenna, based on the degree of correlation detected by said N correlation units,
wherein said N correlation units are configured to detect the degree of correlation between the radio signal received by said antenna and N possible symbols
$\alpha_0 c_1^{(n)}$,
$\alpha_0 c_2^{(n)} + \alpha_1 c_1^{(n)}$,
$\alpha_0 c_3^{(n)} + \alpha_1 c_2^{(n)} + \alpha_2 c_1^{(n)}$,
:
:
$\alpha_0 c_{M-1}^{(n)} + \alpha_1 c_{M-2}^{(n)} + \alpha_2 c_{M-3}^{(n)} +, \ldots, +\alpha_{M-2} c_1^{(n)}$,
$\alpha_0 c_M^{(n)} + \alpha_1 c_{M-1}^{(n)} + \alpha_2 c_{M-2}^{(n)} +, \ldots, +\alpha_{M-2} c_2^{(n)} + \alpha_{M-1} c_1^{(n)}$
each symbol represented by M chips, where n is an integer satisfying the relation $1 < n \leq N$, and $\alpha 0$ and $\alpha 1$ are non-zero constants, $\alpha_2, \ldots, \alpha_{M-1}$ are constants, and
a ratio between said $\alpha 0$ and $\alpha 1$ is a ratio between a channel impulse response coefficient of a preceding wave and a channel impulse response coefficient of a one-chip delay wave each included in the radio signal received by said antenna.

9. The receiver according to claim 8, comprising a delay removal unit configured to remove a k-chip delay wave (where k is a constant equal to or more than 2),
wherein the outputs of said delay removal unit are inputted to said N correlation units, respectively.

10. The receiver according to claim 9, wherein said delay removal unit removes said k-chip delay wave based on the preceding wave included in the radio signal received by said antenna.

11. The receiver according to claim 9, wherein said delay removal unit removes said k-chip delay wave based on the one-chip delay wave included in the radio signal received by said antenna.

12. The receiver according to claim 9, further comprising a level comparison unit configured to compare a signal level of the preceding wave with a signal level of the one-chip delay wave each included in the radio signal received by said antenna,
wherein said delay removal unit removes the k-chip delay wave by using the preceding wave or the one-chip delay wave with larger signal level based on a comparison result of said level comparison unit.

13. The receiver according to claim 8, further comprising:
an amplifier which amplifies the wireless signal received by said antenna;
a frequency converter which converts the output signal of said amplifier to a low-frequency signal; and
an A/D converter which converts the output signal of said frequency converter to a digital signal,
wherein said N correlation units detect the degree of correlation based on the digital signal.

14. The receiver according to claim 8, wherein N correlation units detect the degree of correlation with respect to a wireless signal of CCK (Complementary Code Keying) modulation scheme or M-ary modulation scheme received by said antenna.

15. A wireless LAN apparatus, comprising:
an antenna configured to receive a radio signal including N possible symbols $\{c_1^{(n)}, c_2^{(n)}, \ldots c_{M-1}^{(n)}, c_M^{(n)}\}$, where n is an integer satisfying the relation $1 < n \leq N$, each symbol represented by M chips, M is an integer equal to or more than 2;
N correlation units corresponding to said N possible symbols, respectively, each correlation unit configured to determine the degree of correlation with the radio signal received by said antenna;
a symbol determination unit configured to determine the symbol included in the radio signal received by said antenna, based on the degree of correlation detected by said N correlation units; and
a data processing unit configured to perform decoding based on the symbol determined by said symbol determination unit,
wherein said N correlation units are configured to detect the degree of correlation between the radio signal received by said antenna and the N possible symbols represented by M chips $\{\alpha_0 c_1^{(n)}, \alpha_0 c_2^{(n)} + \alpha_1 c_1^{(n)}, \ldots, \alpha_0 c_{M-1}^{(n)} + \alpha_1 c_{M-2}^{(n)}, \alpha_0 c_M^{(n)} + \alpha_1 c_{M-1}^{(n)}\}$, where n is an integer satisfying the relation $1 < n \leq N$, and $\alpha 0$ and $\alpha 1$ are non-zero constants, and
a ratio between said $\alpha 0$ and $\alpha 1$ is a ratio between a channel impulse response coefficient of a preceding wave and a channel impulse response coefficient of a one-chip delay wave each included in the radio signal received by said antenna.

16. The wireless LAN apparatus according to claim 15, comprising a delay removal unit configured to remove a k-chip delay wave (where k is a constant equal to or more than 2),
wherein the outputs of said delay removal unit are inputted to said N correlation units, respectively.

17. A receiving method, comprising:
receiving a radio signal including N possible symbols $\{c_1^{(n)}, c_2^{(n)}, \ldots c_{M-1}^{(n)}, c_M^{(n)}\}$, where n is an integer satisfying the relation $1 < n \leq N$, each symbol represented by M chips, M is an integer equal to or more than 2 by an antenna;
detecting the degree of correlation between the radio signal received by said antenna and the N possible symbols represented by M chips $\{\alpha_0 c_1^{(n)}, \alpha_0 c_2^{(n)} + \alpha_1 c_1^{(n)}, \ldots, \alpha_0 c_{M-1}^{(n)} + \alpha_1 c_{M-2}^{(n)}, \alpha_0 c_M^{(n)} + \alpha_1 c_{M-1}^{(n)}\}$, where n is an integer satisfying the relation $1 < n \leq N$, and $\alpha 0$ and $\alpha 1$ are non-zero constants; and
determining the symbol included in the radio signal received by said antenna, wherein a ratio between said $\alpha 0$ and $\alpha 1$ is a ratio between a channel impulse response coefficient of a preceding wave and a channel impulse response coefficient of a one-chip delay wave each included in the radio signal received by said antenna.

18. An apparatus, comprising:

N correlation units corresponding to said N possible symbols $\{c_1^{(n)}, c_2^{(n)}, \ldots c_{M-1}^{(n)}, c_M^{(n)}\}$, where n is an integer satisfying the relation $1 < n \leq N$, each symbol represented by M chips, M is an integer equal to or more than 2, respectively, each correlation unit configured to detect the degree of correlation with a preceding wave and a one-chip delay wave included in a radio signal including N possible symbols; and a symbol determination unit configured to detect the symbol included in the radio signal based on the degree of correlation detected by said N correlation units, wherein said N correlation units configured to detect the degree of correlation between the radio signal and the N possible symbols represented by M chips $\{\alpha_0 c_1^{(n)}, \alpha_0 c_2^{(n)} + \alpha_1 c_1^{(n)}, \ldots, \alpha_0 c_{M-1}^{(n)} + \alpha_1 c_{M-2}^{(n)}, \alpha_0 c_M^{(n)} + \alpha_1 c_{M-1}^{(n)}\}$, where n is an integer satisfying the relation $1 < n \leq N$, and $\alpha 0$ and $\alpha 1$ are non-zero constants, wherein a ratio between said $\alpha 0$ and $\alpha 1$ is a ratio between a channel impulse response coefficient of a preceding wave and a channel impulse response coefficient of a one-chip delay wave each included in the radio signal received by said antenna.

* * * * *